United States Patent [19]

Perrotta

[11] 4,376,675

[45] Mar. 15, 1983

[54] METHOD OF MANUFACTURING AN INORGANIC FIBER FILTER TUBE AND PRODUCT

[75] Inventor: Kenneth A. Perrotta, Methuen, Mass.

[73] Assignee: Whatman Reeve Angel Limited, Kent, England

[21] Appl. No.: 193,924

[22] Filed: Oct. 6, 1980

Related U.S. Application Data

[63] Continuation of Ser. No. 42,124, May 24, 1979, abandoned.

[51] Int. Cl.³ .......................... D21D 3/00; D21H 1/08
[52] U.S. Cl. ....................................... 162/145; 55/527; 65/36; 162/156; 162/218; 162/224; 162/228; 210/509; 428/36; 428/286
[58] Field of Search ............... 162/226, 224, 228, 156, 162/145, 218; 55/523, 527, 524, 528; 210/509, 502, 505, 508, 510, 507; 428/35, 36, 286

[56] References Cited

U.S. PATENT DOCUMENTS

| | | | |
|---|---|---|---|
| Re. 29,447 | 10/1977 | Farrow et al. | 210/488 |
| 3,007,813 | 11/1961 | Levecque et al. | 418/286 |
| 3,039,914 | 6/1962 | Reiman | 210/509 |
| 3,117,055 | 6/1964 | Guandique et al. | 428/286 |
| 3,142,612 | 7/1964 | Roman | 210/509 |
| 3,573,158 | 3/1971 | Pall et al. | 162/156 |
| 3,972,694 | 8/1976 | Head | 210/504 |
| 4,032,457 | 6/1977 | Matchett | 210/509 |
| 4,092,194 | 5/1978 | Green | 156/89 |
| 4,102,736 | 7/1978 | Head et al. | 162/156 |
| 4,102,785 | 7/1978 | Head | 210/504 |
| 4,124,360 | 11/1978 | Berger | 85/527 |
| 4,160,059 | 7/1978 | Samejimo | 264/126 |

*Primary Examiner*—Michael W. Ball
*Attorney, Agent, or Firm*—Richard P. Crowley

[57] ABSTRACT

A method of manufacturing a fibrous, nonwoven, flow filter tube and the filter tube so prepared, which method comprises forming a filter tube from an aqueous slurry containing an admixture of both low-melting-point binder and high-melting-point filter fibers, and, thereafter, heating the filter tube to a temperature greater than the temperature of the low-melting-point fibers and less than the temperature of the high-melting-point fibers, to effect melting of the low-melting-point fibers, the molten material of the low-melting point fibers forming at the crossover points of the high-melting-point fibers to act as a bonding agent, thereby preparing a nonwoven, self-supporting, fibrous filter tube composed of the filter fibers.

19 Claims, No Drawings

4,376,675

METHOD OF MANUFACTURING AN INORGANIC FIBER FILTER TUBE AND PRODUCT

This is a continuation of application Ser. No. 42,124, filed May 24, 1979 now abandoned.

BACKGROUND OF THE INVENTION

Flow filter tubes are employed for the filtration of gas and liquid streams, and typically such tubes have been composed of a plurality of interrelated, nonwoven, randomly dispersed fibers which are bonded into a self-supporting flow filter tube at the junction of the fiber crossover points. The fibrous flow filter tube so formed is a self-supporting structure having the desired filtration efficiency and may be prepared so that compression across the full width of the tube edges provides for a fluid-tight seal, as set forth in Reissue Pat. No. 29,447.

Such a filter tube is prepared through, firstly, preparing an aqueous slurry of the fibers, and, thereafter, forming the slurry into a filter tube, typically with the aid of a vacuum mandrel to remove excess water and about which the filter tube is formed, and drying the vacuum-formed filter tube. The dried filter tube is then treated with a bonding agent, removed and, thereafter, heated to a temperature sufficient to effect the fusing or hardening of the bonding agent. The dry filter tube may be impregnated with the bonding agent by immersing the dry filter tube into a solution or emulsion containing the bonding agent, which is typically a resin, such as a thermosetting resin, such as an epoxy resin, phenol-formaldehyde resin or a silicone resin. Thereafter, the tube is heated to drive off any organic solvents in the solution used, or to effect the cross-linking under condensation of resin. To avoid the use of volatile solvents, the use of aqueous dispersions and emulsions of resins or of inorganic sols, such as silica sol, also have been employed as bonding agents.

The process of preparing glass-fiber filter tubes, for example, is set forth more particularly in U.S. Pat. No. 3,972,694, which relates to the use of a hardened silicone resin as a bonding resin. One process of forming a flow filter tube, containing a series of intermittent layers, is set forth, for example, in U.S. Pat. Nos. 4,124,360 and 4,078,956. The method of preparing such filter tubes and the filter tubes, themselves, also may have a series of internal scrim-like or porous support sheets formed within the internal wall of the filter tube or as an internal or external support, such as, for example, as set forth in U.S. Pat. No. 4,102,785.

It is desirable to prepare nonwoven, fibrous, self-supporting filter tubes at a lower cost and with better physical properties than those heretofore prepared which employ bonding agents. It also would be desirable to avoid the additional manufacturing steps occasioned through the use of a bonding agent and problems associated therewith.

SUMMARY OF THE INVENTION

My invention concerns a method of preparing a fibrous flow filter tube and to the improved filter tube so prepared. In particular, my invention relates to a method of preparing a filter tube by employing a mixture of fibers of different melting points, wherein the low-melting-point fibers serve, on heating, as the bonding agent, and to the filter tubes so prepared. More particularly, my invention relates to the preparation of improved, nonwoven, self-supporting, glass filter tubes in which the bonding agent is formed from borosilicate glass fibers having a lower melting point than the quartz fibers employed as the filter tube, and to the filter tube so prepared.

My method of preparing a nonwoven, fibrous, flow filter tube comprises preparing an aqueous slurry of fibers in which the fibers in the slurry are composed of fibers of specifically different composition or properties, such as of different melting-point temperatures, the fibers having distinct melting-point differences. The low-melting-point fibers will be referred to as the bonding or binder fibers, and the high-melting-point fibers, serving to form the filter tube, will be referred to as the filter fibers. The bonding fibers are present in an amount sufficient to act as a bonding agent for the high-melting-point filter fibers which form a filter tube, on subsequent heating of the filter tube after formation from the slurry.

My method of preparing an improved flow filter tube comprises providing an aqueous slurry which contains an admixture of bonding fibers and filter fibers, the filter fibers having a higher melting point than the bonding fibers, and forming a filter tube typically by the use or aid of a vacuum mandrel from the fibers of the slurry, drying the filter tube, and, thereafter, heating the filter tube to a temperature greater than the melting point of the low-melting-point bonding fibers and less than the high melting point of the filter fibers and for a time to effect the melting of the bonding fibers, whereby the bonding fibers will serve as a bonding agent at the crossover points of the high-melting-point filter fibers of the filter tube.

For example, I have found that a glass-fiber flow filter tube of improved physical properties can be prepared, without the necessity of employing a separate resin or other bonding operation, through providing an aqueous slurry which contains an admixture of glass fibers, typically silicate and borosilicate glass fibers, having a diameter of, for example, from about 0.1 to 10 microns; for example, 0.03 to 8 microns, the glass fibers having different melting points and forming a filter tube of the glass fibers about the surface of a cylindrical vacuum mandrel to remove excess water, and heating the formed filter tube to remove water and to dry the filter tube, and, thereafter, merely heating the filter tube to a temperature sufficiently high to melt the low-melting-point glass fibers, so that the low-melting-point glass fibers on cooling then will form and serve as a bonding agent to the high-melting-point remaining fibers of the filter tube. My process, thus, permits the preparation of an all-inorganic, silicate, glass-fiber tube having improved physical properties at a lower manufacturing cost and avoids the necessity of employing resin or other binders and the steps associated therewith.

In addition, fibrous, nonwoven filter tubes may be prepared by my process, employing high-melting, glass, filter fibers, together with low-melting plastic or polymeric fibers, so that the resulting flow filter tube prepared will have a thermoplastic polymer as the bonding agent, which method also eliminates the separate step of dipping or otherwise impregnating the glass filter tube with the bonding agent.

My method provides for improved flow filter tubes, which tubes do not require an additional bonding agent, and which tubes have improved physical properties, such as burst and collapse strength, and which tubes, for example, where all-inorganic fibers are employed, may be used with corrosive or hazardous fluids. My method provides for a reduction in cost of manufacturing the tubes and avoids the use of separate impregnating and heating steps and the necessity of dealing with volatile solvents where organic solutions are used, or other difficulties associated with the use of binders, such as the migration of resin where dispersions or resin emulsions are employed.

My method permits the preparation of a single, fibrous, flow filter tube or, if desired, a sequential formation of one over the other of fibrous filter tubes employing the same or different fibers for each tube, so that a composite coalescent filter tube may be prepared comprising a plurality of layers of fibers, with the same or different bonding fibers or filter tubes, through the selection of the appropriate low-melting-point fibers. My method is particuarly advantageous in the preparation of fibrous filter tubes, such as glass-fiber filter tubes of an open structure which are difficult to prepare, where the filter tubes must be immersed in a bonding-agent solution or emulsion; that is, glass-fiber filter tubes, for example, having a filtration efficiency of 80% to 99.99% at 0.6 microns. My invention is based on the discovery that such admixture of fibrous filter tubes may be dispersed in an aqueous dispersion, and, after formation of the filter tube and on heating the low-melting-point fibers for example, having a melting-point range of 1000° F. to 1400° F., the melting fibers move toward and form, in a substantial part, about the crossover points of the filter fibers, to form on cooling a nonwoven, self-supporting flow tube.

Typically, the fibers selected for use in my invention may vary in diameter and composition, but, in particular, my invention is directed to a method of preparing filter tubes employing fibers having a diameter of from about 0.01 to about 10 microns; for example, 0.03 to 8 microns, and more particularly 0.02 to 5.0 microns. The aqueous slurry employed may be formed in the usual manner, as known in the prior art, and typically is an acidic slurry where glass fibers are employed, and often comprises from about 1% to as high as 60% by total weight of the fibers, with from about 5% to 60% by weight of the fibers composed of the low-melting-point fibers; for example, 10% to 35% by weight. The bonding fibers and the filter fibers may be of the same or different diameters and may be dispersed in the aqueous slurry either together or preferably sequentially.

The fibers may be composed of organic or inorganic fibrous material or an admixture thereof, such as, for example, inorganic fibers of alumina fibers, zirconia fibers, titanate-type fibers and more preferably glass fibers, particularly quartz and borosilicate glass fibers. The fibers also may comprise a polymeric material, such as, for example, the use of thermoplastic polymeric fibers having a melting point of about 200° F. to 350° F., such as olefinic fibers like polyethylene, polypropylene, polyamide fibers such as nylon, polyesters, acrylate fibers, urethane fibers, or various combinations thereof.

In one preferred embodiment of my invention, it is desired to provide an all-inorganic filter tube by my method, wherein glass fibers are employed without different melting points, and, in another embodiment of my invention, it is desired to form a nonwoven, glass-fiber filter tube employing a mixture of olefinic fibers as the bonding fibers, such as polyethylene or polypropylene fibers, and glass fibers as the filter fibers, to form a low-cost flow filter tube. The aqueous slurry of the fibers prepared may contain various and other additives, such as acids, acid salts or other additives, to adjust, control or maintain the pH, and dispersing agents, such as surfactants, as well as other required additives.

In the slurry, the fibers should be so selected so as to have a definitive melting point or a definitive melting-point range, where a mixture of fibers is employed. Typically, the difference in melting point or melting-point range between the binder fibers and the filter fibers should be such as to enable the heating operation to be carried out without any substantial melting or undesired softening of or effect on the high-melting-point filter fibers. For example, I have found, in connection with the preparation of an all-inorganic, glass, nonwoven, fluid filter tube, that a difference in temperature of greater than approximately 200° F.; for example, greater than 300° F. to 400° F., is most desirable, since it avoids the need for very careful control of oven or other temperatures. However, in certain circumstances, the difference in temperature range may vary and be quite close, depending upon the particular melting-point or softening-point range of the fibers employed. Generally speaking, where a commercial-grade oven or heater is employed, a range of at least 100° F. to 150° F. should be the minimum temperature range employed. During preparation, the filter tubes may contain an internal circular or helical porous scrim-supporting element or employ an internal or external porous support tube or combinations thereof, in order to increase the collapse or burst strength or for other purposes.

Typically, in the preparation of the filter tube from the fibers, a fine-screened, cylindrical, vacuum mandrel is employed, and the fibers may be formed about the vacuum mandrel to form the filter tube, such as, for example, dipping the vacuum mandrel into the filter fibers or by other techniques, wherein a wet mass of the fibers from the slurry are secured about the vacuum mandrel and a vacuum employed to remove excess water by those techniques typically employed in the prior art. After the formation of the filter tube on the vacuum mandrel and the removal of excess water, the filter tube then is removed from the vacuum mandrel and dried. For example, such filter tubes are removed from the mandrel, placed on racks and dried at temperatures of, for example, from about 160° F. to 200° F.

In the prior art, the dried tubes then are employed in a dispersion or dipped in a bonding-agent solution; however, in accordance with the practice of my invention, the dried filter tubes then are heated; for example, in a kiln or by other means, to the desired intermediate temperature between the high-melting-point and low-melting-point ranges and for a sufficient time; for ½ to 6 hours, from 1500° F. to 2200° F. to permit the low-melting-point fibers, which have been dispersed throughout the filter tube as formed, to melt. When employing, for example, quartz fibers, with the fibers having a melting-point range of from about 1800° F. to 2100° F., the low-melting-point borosilicate fibers would have a range of from about 1000° F. to 1500° F.

I have observed that, on melting, the low-melting-point fibers move toward the crossover points with the filter tube, and, therefore, act as a bonding agent, and, on cooling of the tube, secure the formed filter tube into a nonwoven, self-supporting filter tube with improved physical properties. Of course, if desired, the drying and heating steps may be carried out in one operation; although, in the preferred embodiment, the tubes, firstly, are dried and then later heated. The filter tubes so prepared in multiple layers may be used alone or in conjunction with a porous internal/external separate support core.

In summary, my invention involves a novel method of preparing a high-efficiency filter medium, or, particularly, a tube, through the employment of an aqueous slurry of the filter tube and the use of vacuum-forming techniques. My method involves the preparation of an aqueous slurry of fibers of different chemical compositions or types, such as, for example, borosilicate glass at an acidic pH, and then forming the fibers from the slurry about a vacuum mandrel, removing the tubes from the vacuum mandrel, drying the tubes and then heating the tubes to a temperature sufficient to melt the low-melting-point fibers, or, where there is a combination of low-melting-point fibers, at different melting points, to some higher temperature, so as to melt at least one group of fibers to have the fibers form a bonding agent for the tubes.

In my method, since the melting point of the fibers is related to their chemical composition, the filter-tube elements so formed, once vacuum-formed, contain all of the fibers necessary for forming the complete filter-tube structure; for example, about 5% to 50% by weight of the low-melting binder-type fibers. My method eliminates the costly dipping or immersing procedure employed with prior-art techniques and also permits reducing energy consumption in the elimination of such process steps. Furthermore, binder migration normally associated with water-based binders, where a polymeric emulsion is employed, also is eliminated by my process. The filter tubes prepared by my invention, therefore, are prepared at lower cost, with more efficiency and have better physical properties than comparative-type tubes.

My invention will be described for the purpose of illustration only in connection particularly with the preparation of a self-supporting, semirigid, glass-fiber filter tube. However, it is recognized and is within the scope and understanding of my invention, by a person skilled in the art, that my method may be employed with various changes and modifications made to the method.

DESCRIPTION OF THE EMBODIMENTS

EXAMPLE 1

About 23 grams of quartz fibers, composed of approximately 99.6% silicon dioxide and having an average fiber diameter of about 0.49 to 0.58 microns, having a melting point of about 2000° F., were dispersed into a water slurry in a 0.5% concentration at a pH of about 3.0. After dispersion, approximately 15.3 grams of glass borosilicate fibers, having a diameter of from about 0.2 to 0.28 microns and having a melting point of approximately 1280° F., were then dispersed into the same slurry while maintaining the pH at approximately 3.0. Following the complete dispersions of both of the glass fibers, a tubular filter element was then vacuum-formed from the slurry about a cylindrical vacuum mandrel, which vacuum was maintained to remove excess water. The filter-tube element so formed then was removed from the vacuum mandrel and then was dried in a forced-air draft oven at approximately 185° F. for about 4 hours. After drying the dried filter tube then was placed in an electrical kiln and the temperature was raised to approximately 1425° F. and then the tube was removed from the oven. Upon cooling, the filter tube then was tested for physical strength and was found to have a physical strength normally associated with comparable filter tubes of this type. A microscopic examination of the filter tube revealed the bound deposition of the low-melting fibers at the fiber crossover points. The filter tube so formed had improved physical characteristics and represented an all-inorganic filter tube suitable for use in filtering operations, wherein filter tubes containing resin binders would not be permitted or tolerated.

EXAMPLE 2

40 grams of borosilicate glass microfibers, having a diameter of approximately 9.5 to 10.5 microns and a melting point of approximately 1330° F., were dispersed into a water slurry at approximately 0.5% concentration by weight at a pH of 3.0. Then about 29 grams of a high-density, polyethylene, fibrous material, having a melting point of approximately 270° F., were dispersed into the same slurry, maintaining the pH and the concentration. Following complete dispersion, the slurry was then vacuum-formed about a cylindrical vacuum mandrel to form a filter tube, and the vacuum was maintained to remove excess water. The formed tube element then was removed from the vacuum mandrel, racked and then dried in a forced-draft oven at 185° F. for 4 hours. Following drying, the dried filter tube then was placed in an electric oven and the temperature was raised to 325° F., which was maintained for approximately 10 minutes, such temperature being sufficient to permit the melting of the polyethylene fibers. Once fusing of the polyethylene fibers was complete, the filter-tube element was permitted to cool. The filter tube so prepared was suitable for use as a filter tube, while a microscopic examination revealed that the polyethylene fibers were formed as a bonding agent at the crossover points of the glass fibers.

What I claim is:

1. A method of preparing a nonwoven, fibrous, self-supporting, semirigid, all-inorganic, silicate-bound, filter tube consisting essentially of a plurality of interrelated, nonwoven fibers having interstices therebetween, the fibers bonded at the crossover points of the fibers with a bonding agent, which method comprises:
    (a) preparing an aqueous slurry comprising an admixture of low-melting-point, glass-binder fibers and high-melting-point, inorganic, filter fibers, the difference in melting point being greater than 100° F., the glass-binder fibers being present in an amount sufficient to act as a bonding agent for the inorganic filter fibers, the inorganic fibers being present in an amount sufficient to provide for a formed, porous, filter tube;
    (b) forming the fibers from the slurry into a nonwoven filter tube comprising a wet mass of the fibers;
    (c) heating the filter tube so formed to dry the filter tube;
    (d) heating the dried filter tube for a timed period and to a temperature greater than the melting point of the low-melting-point, glass-binder fibers and less than the melting point of the high-melting-point, inorganic filter fibers, to melt substantially all of the low-melting-point, glass-binder fibers and to have the low-melting-point molten material move to the crossover points of the inorganic filter fibers, the heating carried out, without any substantial softening of the inorganic filter fibers; and (e) cooling and recovering the porous filter tube of inorganic fibers, wherein the glass of the glass fibers forms the bonding agent for the inorganic filter tube.

2. The method of claim 1 wherein the slurry contains from about 1% to 60% by weight of the fiber admixture, and wherein the binder fibers comprise from about 5% to 60% by weight of the total admixture of the fibers in the slurry.

3. The method of claim 1 wherein the inorganic filter fibers are selected from the group consisting of alumina, zirconia, titanate and quartz fibers.

4. The method of claim 1 wherein the glass-binder fibers have a melting-point range of from about 1000° F. to 1500° F.

5. The method of claim 1 wherein the glass-binder fibers are borosilicate glass fibers.

6. The method of claim 1 which includes heating the dried filter tube to a temperature of from about 1500° F. to 2200° F.

7. The method of claim 1 which includes heating the dried filter tube for a period of time of from ½ hour to 6 hours.

8. The method of claim 1 wherein the glass-binder fibers are borosilicate glass fibers and the inorganic filter fibers are quartz glass fibers, with a melting-point difference between the fibers of greater than about 400° F.

9. The method of claim 8 wherein the binder and inorganic fibers have a range of from about 0.01 to about 10 microns in diameter.

10. The method of claim 8 wherein the inorganic filter tube has a filtration efficiency of 80% to 99.99% at 0.6 microns.

11. The filter tube prepared by the method of claim 8.

12. The method of claim 1 which includes forming the filter tube by the use of a vacuum mandrel, wherein a vacuum is employed to remove excess water from the fibers formed around the external diameter of the vacuum mandrel.

13. The method of claim 12 wherein the vacuum mandrel is inserted into the aqueous slurry, and the vacuum maintained to deposit a desired amount and thickness of the fibers onto the external surface of the vacuum mandrel to form the filter tube.

14. The method of claim 1 wherein the method is repeated to form a filter tube composed of a plurality of different layers of the inorganic, silicate-bound, filter fibers.

15. The method of claim 1 wherein the filter fibers are quartz fibers having a diameter of from about 0.03 to 8 microns.

16. The method of claim 1 wherein the inorganic filter fibers have a melting point of from 1800° F. to 2200° F., and the glass-binder fibers have a melting point of from 1000° F. to 1500° F.

17. The filter tube prepared by the method of claim 1.

18. A method of preparing a self-supporting, semi-rigid, all-inorganic, silicate-bound, nonwoven, porous, filter tube, which method comprises:
  (a) providing an acidic aqueous slurry containing from about 1% to 60% by weight of an admixture of binder fibers and filter fibers, the fibers having a diameter of from about 0.01 to 10 microns, the binder fibers comprising about 5% to 60% by weight of the fiber admixture, the filter fibers composed of quartz fibers having a melting point of from about 1800° F. to 2200° F., and the binder fibers composed of borosilicate glass and having a melting point of from about 1000° F. to 1500° F.;
  (b) forming a wet mass of the nonwoven fiber admixture into a filter tube on the surface of a cylindrical vacuum mandrel;
  (c) drying the filter tube so formed;
  (d) heating the dried filter tube to a temperature of from about 1500° F. to 2200° F. and for a time period sufficient to melt the glass-binder fibers and to have the molten borosilicate glass move to the crossover points of the quartz filter fibers, the heating carried out without any substantial softening of the quartz filter fibers; and
  (e) cooling and recovering a filter tube consisting essentially of the borosilicate material as a bonding agent for the quartz filter fibers of the filter tube.

19. The filter tube prepared by the method of claim 18.

* * * * *